United States Patent
Kim

(10) Patent No.: US 9,418,410 B2
(45) Date of Patent: Aug. 16, 2016

(54) IMAGE PROCESSING APPARATUS AND METHOD THEREOF

(71) Applicant: SAMSUNG ELECTRONICS CO., LTD., Suwon-si (KR)

(72) Inventor: Bong-joe Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/608,918

(22) Filed: Jan. 29, 2015

(65) Prior Publication Data
US 2015/0213582 A1    Jul. 30, 2015

(30) Foreign Application Priority Data
Jan. 29, 2014    (KR) .................. 10-2014-0011442

(51) Int. Cl.
| | | |
|---|---|---|
| *G06K 9/00* | (2006.01) | |
| *G06T 5/40* | (2006.01) | |
| *G06T 7/00* | (2006.01) | |
| *G06T 5/00* | (2006.01) | |

(52) U.S. Cl.
CPC . *G06T 5/40* (2013.01); *G06T 5/008* (2013.01); *G06T 7/0081* (2013.01)

(58) Field of Classification Search
USPC ........... 382/169, 168, 274; 345/611; 358/520; 378/95
See application file for complete search history.

(56) References Cited

U.S. PATENT DOCUMENTS

| | | | |
|---|---|---|---|
| 6,341,172 B1 * | 1/2002 | Xu | G01T 1/2018 378/95 |
| 8,411,991 B2 * | 4/2013 | Jo | G06T 5/002 345/611 |

FOREIGN PATENT DOCUMENTS

KR    10-2009-0092909 A    9/2009

* cited by examiner

*Primary Examiner* — Anh Do
(74) *Attorney, Agent, or Firm* — Sughrue Mion, PLLC

(57) ABSTRACT

An image processing method includes dividing an image into one or more regions, obtaining a region-based histogram smoothing function for processing the image to have a uniform number of pixels based on a pixel value for each of the divided region, obtaining a global smoothing function for an entire image using the obtained region-based histogram smoothing function, obtaining a local smoothing function for each pixel of the image using the region-based histogram smoothing function applied to a region in a block, and obtaining a sum of weight values of the global smoothing function and the local smoothing function, and determining the pixel value, based on the obtained sum of the weight values.

14 Claims, 6 Drawing Sheets

IMAGE PROCESSING APPARATUS AND METHOD THEREOF

CROSS-REFERENCE TO RELATED APPLICATION

This application claims priority from Korean Patent Application No. 10-2014-0011442, filed on Jan. 29, 2014, in the Korean Intellectual Property Office, the disclosure of which is incorporated herein by reference in its entirety.

BACKGROUND

1. Field

An apparatus and a method consistent with one or more exemplary embodiments broadly relate to an image processing method and apparatus for enhancing a contrast of an image.

2. Description of the Related Art

As a method of enhancing a contrast of an image, there is a histogram smoothing method that calculates a histogram of an image, and redistributes a pixel value so that the histogram of the image has a uniform distribution for each pixel value. The histogram of the image denotes a graph that shows the number of pixels corresponding to each pixel value in a range from a darkest region to a brightest region of the image.

According to the histogram smoothing method, an image processing apparatus may adjust a pixel value of an image so that the number of pixels corresponding to each pixel value has a uniform distribution, in a histogram of the image.

However, in a case where a distribution of the histogram of the image does not correspond to a normal distribution, when the image processing apparatus adjusts a pixel value according to the histogram smoothing method, a bright region of the image is washed out.

SUMMARY

One or more exemplary embodiments include an image processing method and apparatus for enhancing a contrast of an image by using a histogram smoothing function which is acquired for each of the regions into which an image is divided, based on a similarity between adjacent pixels of an image.

Additional aspects of exemplary embodiment may be apparent from the description of exemplary embodiments, or may be learned by practice of exemplary embodiments.

According to one or more exemplary embodiments, an image processing method includes: dividing an image into at least one region; obtaining a region-based histogram smoothing function for processing the image to have a uniform number of pixels based on a pixel value for each region of the divided image; obtaining a global smoothing function for an entire region of the image by using the obtained region-based histogram smoothing function of each region in the divided image; obtaining a local smoothing function for each pixel in the image by using the region-based histogram smoothing function which is applied to a region included in a block; and determining a sum of weight values of the global smoothing function and the local smoothing function, and determining the pixel value for said each region of the divided image, based on the determined sum of the weight values.

The determining of the pixel value for said each region of the divided image may include: determining a first weight value, based on a characteristic of a pixel; and obtaining the sum of the weight values of the global smoothing function and the local smoothing function, based on the determined first weight value.

The obtaining of the global smoothing function may include: determining, for each of the at least one region, a second weight value for the region-based histogram smoothing function; and obtaining an average value for pixel values in said each region, in which the determined second weight value is applied to the region-based histogram smoothing function, and the second weight value may be proportional to a size of a region for the region-based histogram smoothing function.

The obtaining of the local smoothing function may include: determining a central pixel; determining a block having a certain size with respect to the determined central pixel; and obtaining a local histogram smoothing function for each pixel in the block except for the central pixel by using a histogram smoothing function of a region comprising at least some of the pixels in the block.

The obtaining the local histogram smoothing function may include calculating an average value of a region-based histogram smoothing function, in which an obtained third weight value is applied to each pixel included in the block, to obtain the local histogram smoothing function, and the obtained third weight value may be one of inversely proportional to a distance between a pixel in the block and the central pixel, or proportional to a size of a region in the block.

According to one or more exemplary embodiments, an image processing apparatus includes: a region divider configured to divide an image into at least one region; a region-based histogram smoothing function obtainer configured to obtain a region-based histogram smoothing function for processing the image to have a uniform number of pixels based on a pixel value for each of the divided at least one region; a global smoothing function obtainer configured to obtain a global smoothing function for an entire region of the image by using the obtained region-based histogram smoothing function; a local smoothing function obtainer that obtains a local smoothing function for each pixel of the image by using the region-based histogram smoothing function for a region which is included in a block with each pixel of the image as a reference; and an image processor configured to obtain a sum of weight values of the global smoothing function and the local smoothing function, and configured to determine the pixel value, based on the obtained sum of the weight values.

BRIEF DESCRIPTION OF THE DRAWINGS

These and/or other aspects of exemplary embodiments will become apparent and more readily appreciated from the following description of the exemplary embodiments, taken in conjunction with the accompanying drawings in which.

DETAILED DESCRIPTION OF EXEMPLARY EMBODIMENTS

Figure 1:
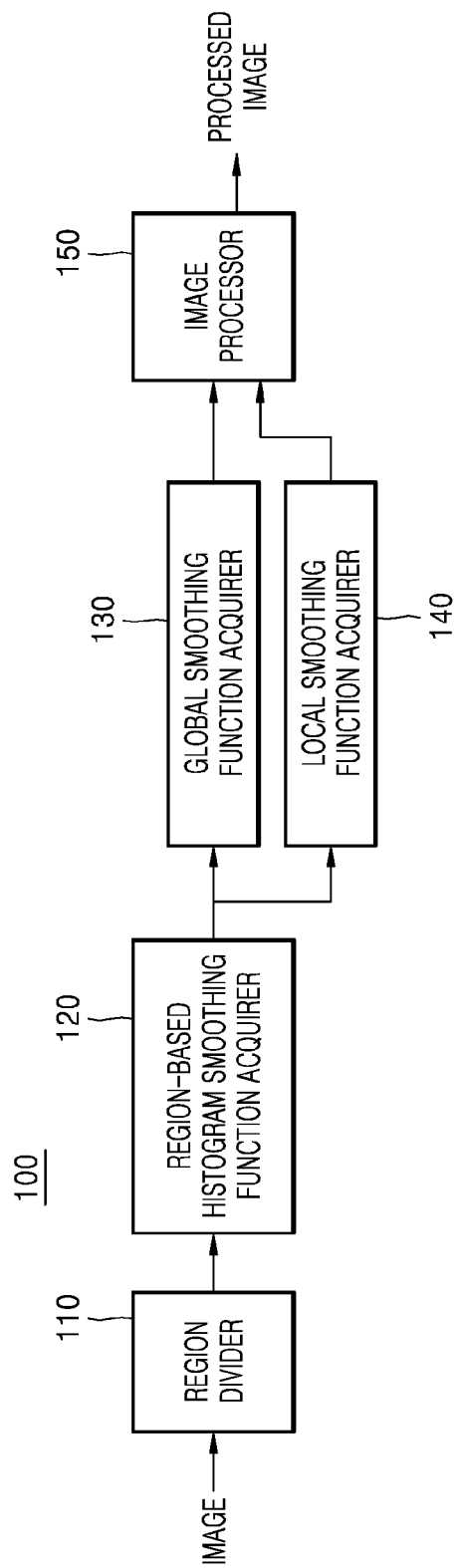
FIG. 1 is a block diagram illustrating an internal configuration of an image processing apparatus according to an exemplary embodiment.

Reference will now be made in detail to exemplary embodiments, which are illustrated in the accompanying drawings, where like reference numerals refer to like elements throughout. In this regard, exemplary embodiments may have different forms and should not be construed as being limited to the descriptions set forth herein. Accordingly, exemplary embodiments are described below, by referring to the figures, merely for the purpose of explaining aspects of the present disclosure and should not be construed as being limiting of the inventive concept.

Hereinafter, exemplary embodiments will be described in detail with reference to the accompanying drawings. In the following description of exemplary embodiments, when the detailed description of the relevant known function or configuration is determined to unnecessarily obscure an inventive concept, the detailed description thereof will be omitted. Like reference numerals refer to like elements throughout.

The terms or words used in exemplary embodiments, are not necessarily limited to a common or dictionary meaning, and should be construed based on the meanings and concepts corresponding to technical aspects consistent with exemplary embodiments. Therefore, the configuration shown in exemplary embodiments described herein are provided by way of an example, and one of ordinary skill in the art would readily appreciate that many modifications and variations are within the scope of an inventive concept.

In exemplary embodiments described below, when it is described that something comprises (or includes or has) some elements, it should be understood that it may comprise (or include or have) only those elements, or it may comprise (or include or have) other elements as well as those elements if there is no specific limitation. Moreover, each of terms such as " . . . unit", " . . . apparatus" and "module" described in this specification denotes an element for performing at least one function or operation, and may be implemented in hardware, software or the combination of hardware and software.

Hereinafter, exemplary embodiments will be described in detail to be easily embodied by those of ordinary skill in the art with reference to the accompanying drawings. The inventive concept may, however, be embodied in many different forms and should not be construed as being limited to the exemplary embodiments set forth herein. In the accompanying drawings, a portion irrelevant to a description of exemplary embodiments will be omitted for clarity. Moreover, like reference numerals refer to like elements throughout.

The term 'image' may be used as a comprehensive term for describing various forms of image information known to those of ordinary skill in the art as 'frame', 'field', and 'slice', in addition to 'image' itself.

According to an exemplary embodiment, in a single-color image, a pixel value of a pixel constituting an input image may be a value from 0 to 255. Also, when an input image is an RGB image or a YCbCr image, the input image may have pixel values by color channel. Hereinafter, a case in which an input image is a single-color image having a pixel value from 0 to 255 will be described as an example, but an exemplary embodiment is not limited thereto. Even when an input image is an RGB image or a YCbCr image, similarly to a single-color image being processed, a pixel value may be processed for each color channel.

Hereinafter, exemplary embodiments will be described in detail with reference to the accompanying drawings.

FIG. 1 is a block diagram illustrating an internal configuration of an image processing apparatus 100 according to an exemplary embodiment.

The image processing apparatus 100 according to an exemplary embodiment may process an image for enhancing a contrast of the image. For example, the image processing apparatus 100 improves a contrast of an image by using a histogram having a certain shape. The histogram shows a range from a darkest region to a brightest region of an image, and the image processing apparatus 100 converts an accumulation histogram distribution of an image to redistribute a brightness value of the image, thereby improving a contrast of the image. In other words, the image processing apparatus 100 readjusts brightness values of pixels, with a focus on a certain brightness region, to allow the brightness values to be more broadly distributed, and thus enhances a contrast of an image, thereby improving image quality.

Examples of a method of enhancing a contrast of an image include a histogram equalization (HE) method, a brightness preserving bi-histogram equalization (BBHE) method, a dynamic histogram equalization (DHE) method, and an adaptive histogram equalization (AHE) method which are histogram smoothing methods. Each of the HE method, the BBHE method, the DHE method, and the AHE method is an example of a histogram smoothing method. The image processing apparatus 100 according to an exemplary embodiment enhances a contrast of an image according to the histogram smoothing method.

Moreover, the image processing apparatus 100 according to an exemplary embodiment may perform an image processing operation for improving a contrast of an image by using a histogram smoothing function, which is obtained for each region of the image. In this case, the image processing apparatus 100 may obtain a histogram smoothing function for each of the regions into which an image is divided based on a similarity between adjacent pixels of an image, and process the image by using the obtained histogram smoothing function for each region, based on a characteristic of each divided region.

Therefore, since an image processing operation is performed according to a histogram smoothing function which is determined for each divided region based on a similarity with adjacent pixels, a histogram of an image does not have a normal distribution characteristic, and thus, a bright region of the image is prevented from being washed out. This is because the histogram of various regions in the image is obtained based on a similarity with adjacent pixels and each region of the image can have the normal distribution characteristic.

Referring to FIG. 1, the image processing apparatus 100 according to an exemplary embodiment may include a region divider 110, a region-based histogram smoothing function obtainer 120, a global smoothing function obtainer 130, a local smoothing function obtainer 140, and an image processor 150. The image processing apparatus 100 may be implemented with more elements or less elements than the number of the illustrated elements according to an exemplary embodiment.

The region divider 110 may divide an image into at least one region. In this case, in an exemplary embodiment, the region divider 110 may divide the image into the at least one region, based on a similarity between adjacent pixel values. For example, the region divider 110 may divide the image into the at least one region according to whether a difference value between the adjacent pixel values is within a certain range.

That is, the region divider 110 may divide the image into the at least one region according to whether a difference value between pixel values included in the same region is within a certain range.

The region-based histogram smoothing function obtainer 120 may obtain a histogram smoothing function for processing the image so as to have the uniform number of pixels according to a pixel value for each of the regions into which the image is divided by the region divider 110. In this case, according to an exemplary embodiment, the region-based histogram smoothing function obtainer 120 may obtain a region-based histogram smoothing function according to the above-described histogram smoothing method, namely, at least one selected from among the HE method, the BBHE method, the DHE method, and the AHE method.

The global smoothing function obtainer 130 may obtain a global smoothing function for an entire region of the image by using the region-based histogram smoothing function. In detail, the global smoothing function obtainer 130 may calculate an average value of pixel values, in which different weight values are applied to a plurality of the region-based histogram smoothing functions, to obtain the global smoothing function. For example, the global smoothing function may be calculated as expressed in the following Equation (1):

$$T_{Global}(k) = \frac{1}{n}\sum_{i=n}^{n-1} w_i T_i(k) \quad (1)$$

where $T_{Global}(k)$ denotes the global smoothing function, and k denotes a pixel value of each pixel. Hereinafter, T(k) or T(x, y) may denote a function in which a pixel value having a k value or a pixel value of a (x, y) position is an input value, and a value which is obtained by a histogram smoothing function readjusting an input pixel value is an output value.

$T_i(k)$ may denote a histogram smoothing function which is obtained for each region. n may denote the number of pixels included in an image. $w_i$ may denote a second weight value which is applied to the region-based histogram smoothing function for obtaining the global smoothing function.

The second weight value "$w_i$" may have a value proportional to a size of a region of the region-based histogram smoothing function corresponding to each weight value. For example, the second weight value "$w_i$" may be determined based on a monotone increasing function (for example, log, exp, etc.) proportional to the size of the region of the region-based histogram smoothing function.

The local smoothing function obtainer 140 may obtain a local smoothing function for each pixel by using the region-based histogram smoothing function for a region which is included in a block based on each pixel of the image. In detail, the local smoothing function obtainer 140 may obtain the local smoothing function by using the region-based histogram smoothing function for each block having a certain size. For example, the local smoothing function may be calculated as expressed in the following Equation (2):

$$T_{Local(x,y,k)} = \frac{1}{N} \sum_{(x+x',y+y')} W(x', y') \times T_{i=L(x+x',y+y')}(k), -b \leq x', y' \leq b \quad (2)$$

where $T_{Local}(k)$ denotes the local smoothing function, and k denotes a pixel value of each pixel. b denotes a half of a block size, and a width and height size of a block may be 2b. N may denote the number of pixels included in each block in which the local smoothing function is acquired. $T_i(k)$ may denote a histogram smoothing function which is obtained for each region. W(x', y') may denote a third weight value which is applied to the region-based histogram smoothing function for obtaining the local smoothing function.

The local smoothing function obtainer 140 may determine a central pixel (x, y) for each pixel in a region to obtain the local smoothing function. The local smoothing function obtainer 140 may determine, as a central pixel, a pixel in which the local smoothing function is to be obtained, and arrange a block with respect to the central pixel. The local smoothing function obtainer 140 may obtain the local smoothing function for the central pixel according to the above-described Equation (2) by using pixel values (x', y') included in a corresponding block.

Referring to Equation (2), the local smoothing function may be obtained by obtaining an average value of the region-based histogram smoothing function to which the third weight value corresponding to each pixel value (x', y') included in a corresponding block is applied. Here, the third weight value may have a value proportional to a size in a block of a region corresponding to the region-based histogram smoothing function of each pixel value (x', y') to which the third weight value is applied. Also, the third weight value may have a value which is inversely proportional to a distance between a central pixel (x, y) and each pixel value (x', y') included in a block.

Moreover, the third weight value may be determined from a lookup table including a result which is previously calculated by an arithmetic operation. The local smoothing function obtainer 140 may decrease a complexity of calculation by using the lookup table for obtaining the third weight value.

The image processor 150 may determine each pixel value of the image for improving a contrast by using the global smoothing function and the local smoothing function respectively obtained by the global smoothing function obtainer 130 and the local smoothing function obtainer 140. In detail, according to an exemplary embodiment, the image processor 150 may calculate a sum of weight values of the global smoothing function and the local smoothing function to obtain a final function, and determine each pixel value by using the final function. For example, each pixel value may be determined as expressed in the following Equation (3):

$$o(x,y,z) = (1-w(x,y)) \times T_{Global}(k) + w(x,y) \times T_{Local}(x,y,k) \quad (3)$$

Referring to Equation (3), a pixel value o(x, y, k) may be obtained from the final function to which a value, where a first weight value is applied to the global smoothing function and the local smoothing function, is added.

The first weight value, namely, w(x, y), is a value which is determined based on a characteristic of each pixel, and for example, w(x, y) may have a value proportional to an edge intensity of a pixel. That is, a w(x, y) value may be determined in proportion to a density degree of a corresponding pixel.

When an image is processed in a flat region by the global smoothing function, an output image is natural because the output image has an average brightness value similar to that of an input image, but since a dense portion is not normally expressed in a dense region, a light image may be output. That is, the dense portion of the input image is lost or output as a light portion when global smoothing function is applied. On the other hand, when an image is processed in a flat region of the image by the local smoothing function, an output image is unnatural, but an image in which a dense portion is normally displayed may be output in a dense region. That is, a dense portion of the input image is output as a dense portion of the output image (i.e., displayed as bright pixels) when local smoothing function is applied. Therefore, the image processor 150 may obtain the final function by applying different weight values to the global smoothing function and the local smoothing function depending on a characteristic of each pixel, and determine a pixel value, based on the final function.

In other words, the image processing apparatus 100 may determine a w(x, y) value proportional to a density degree, so that a dense portion is normally displayed in a dense region i.e., the dense portion is displayed as a dense portion—and an image is naturally displayed in a flat region.

Figure 2:
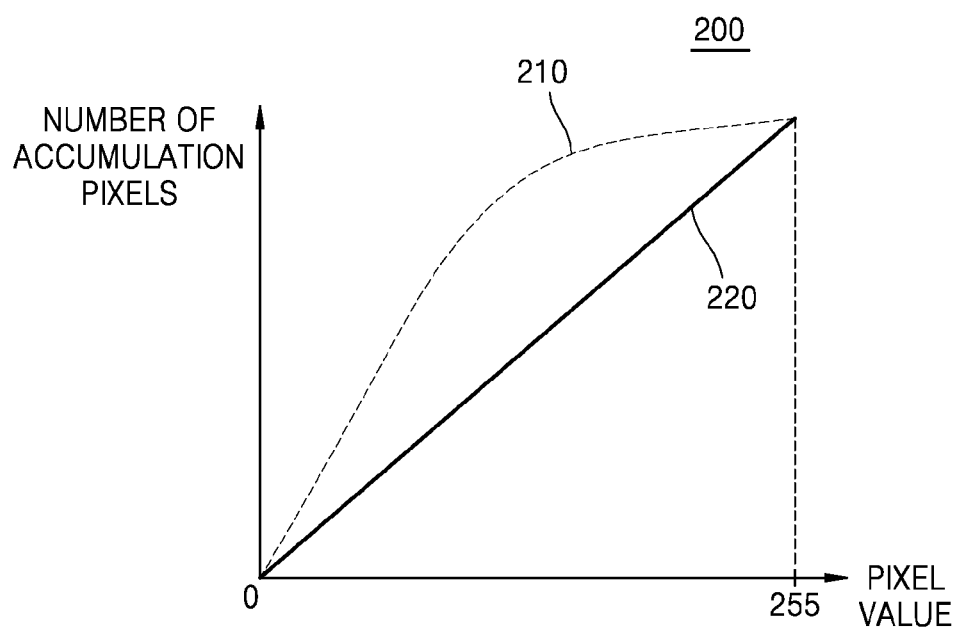
FIG. 2 is a view illustrating a histogram smoothing function according to an exemplary embodiment.

FIG. 2 is a view illustrating a histogram smoothing function according to an exemplary embodiment.

Referring to FIG. 2, a before-image-processing graph 210 and a graph 220 showing a result which is obtained through processing based on the histogram smoothing function are shown, according to an exemplary embodiment.

Referring to the before-image-processing graph 210, it may be seen that as a pixel value increases, the number of pixels for each pixel value is small, and for this reason, the number of pixels for each pixel value is not uniformly distributed.

Referring to the graph 220 showing a result which is obtained through processing based on the histogram smoothing function, the number of pixels for each pixel value is uniformly distributed, and thus, the number of accumulation pixels may be proportional to a pixel value. That is, according to the histogram smoothing function, each pixel value may be determined so that the number of pixels for each pixel value is uniformly distributed, and an image may be processed.

The image processing apparatus 100 according to an exemplary embodiment may process an image by using the histogram smoothing function. To provide a detailed description of an exemplary embodiment, the image processing apparatus 100 may obtain a function for processing an image, in which each pixel value of an input image is an input value, from the histogram smoothing function, and determine a pixel value, in which a value is readjusted based on the histogram smoothing function, by using the obtained function.

The above-described histogram smoothing function, according to an exemplary embodiment, may be used as a global histogram smoothing function and a local histogram smoothing function according to a global/local histogram smoothing technique, and as described above, according to an exemplary embodiment, the global/local histogram smoothing function may be referred to as a global smoothing function or a local smoothing function.

Hereinafter, an image processing method of the image processing apparatus 100 will be described in detail.

Figure 3:
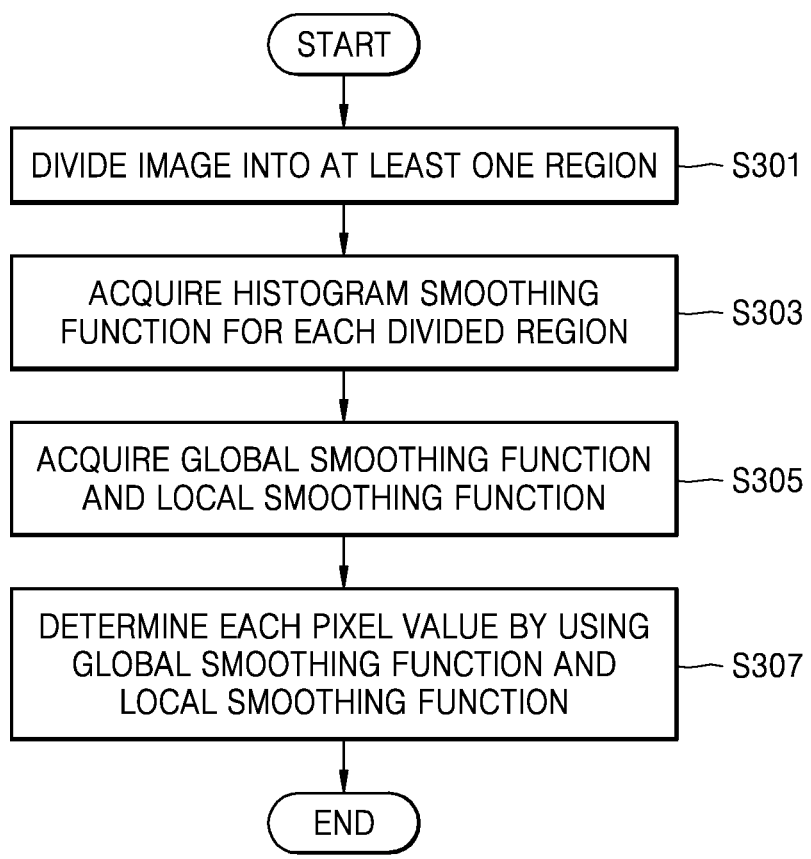
FIG. 3 is a flowchart illustrating an image processing method according to an exemplary embodiment.

FIG. 3 is a flowchart illustrating an image processing method according to an exemplary embodiment.

Referring to FIG. 3, in operation S301, the image processing apparatus 100 may divide an image into at least one region. In this case, in an exemplary embodiment, the image processing apparatus 100 may divide the image, based on similarity between adjacent pixel values. That is, the image processing apparatus 100 may divide a region of the image according to whether a difference between pixel values is within a certain range.

In operation S303, the image processing apparatus 100 may obtain a histogram smoothing function for each of the regions into which the image is divided in operation S301. That is, the image processing apparatus 100 may obtain a histogram smoothing function in which the number of pixels corresponding to each pixel value is uniformly distributed.

Referring to operation S305, the image processing apparatus 100 may obtain a global smoothing function and a local smoothing function by using the region-based histogram smoothing function which is obtained in operation S303.

To provide a detailed description according to an exemplary embodiment, the image processing apparatus 100 may obtain the global smoothing function for an entire region of the image by using the region-based histogram smoothing function which is obtained in operation S303. In this case, the image processing apparatus 100 may calculate an average value of the region-based histogram smoothing function, to which a weight value is applied, to obtain the global smoothing function.

Moreover, the image processing apparatus 100 may obtain the local smoothing function for each pixel by using the region-based histogram smoothing function, which is obtained in operation S303, for a region which is included in a block based on each pixel. In the case, the image processing apparatus 100 may obtain the local smoothing function from an average value of the region-based histogram smoothing function to which a weight value included in a block based on each pixel is applied.

A method of obtaining the global smoothing function and the local smoothing function for example by the global smoothing function obtainer 130 and local smoothing function obtainer 140 will be described in detail, according to an exemplary embodiment, with reference to FIGS. 4 and 5.

Referring to operation S307, the image processing apparatus 100 may determine pixel values of the image by using the global smoothing function and the local smoothing function. In this case, in an exemplary embodiment, the image processing apparatus 100 may apply different weight values to the global smoothing function and the local smoothing function depending on a characteristic of a pixel value, and may calculate a function which is obtained by summating the global smoothing function and the local smoothing function to which the different weight values are applied. Furthermore, the image processing apparatus 100 may determine a first weight value depending on a characteristic of a pixel as expressed in Equation (3), and may obtain, for each pixel, a function for redistributing a pixel value for improving a contrast of the image. Also, the image processing apparatus 100 may determine each pixel value by using a function which includes both a global smoothing function and a local smoothing function with different weights, which is obtained for each pixel. A method of obtaining the function (so called "the final function") using the global smoothing function and the local smoothing function illustrated in FIG. 3 may correspond to the above-described Equation (3), according to an exemplary embodiment.

Figure 4:
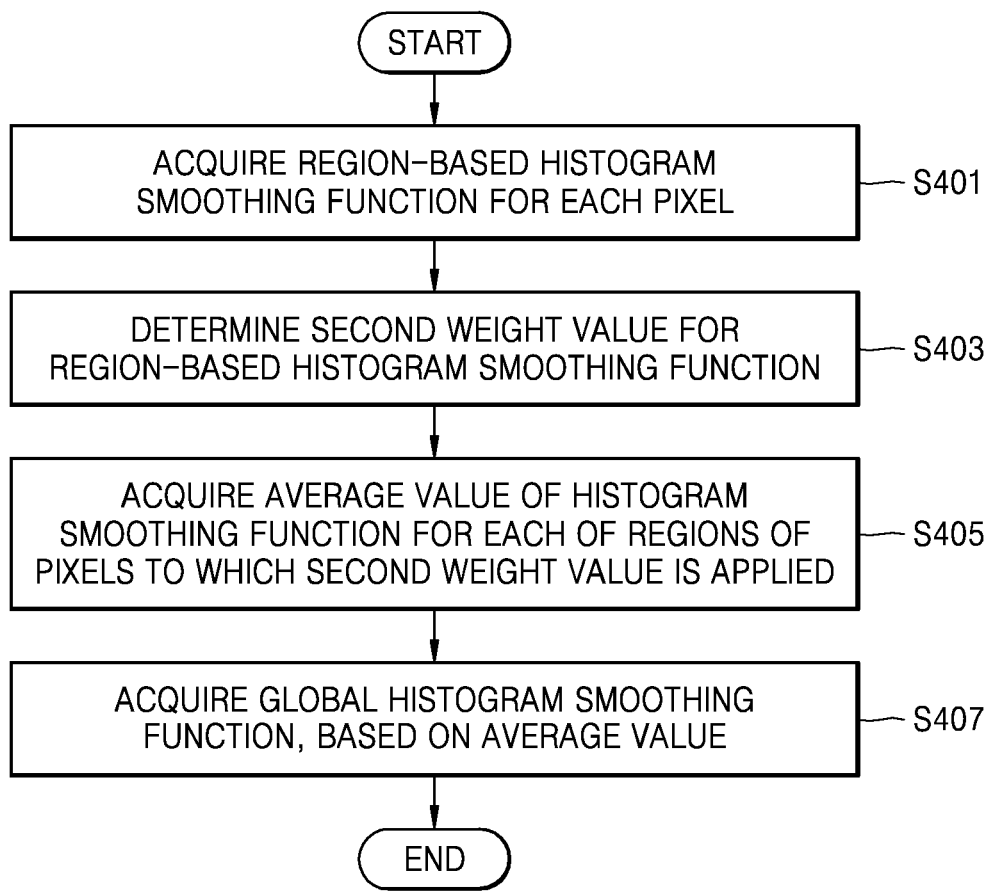
FIG. 4 is a flowchart illustrating a method of acquiring a global histogram smoothing function according to an exemplary embodiment.

FIG. 4 is a flowchart illustrating a method of obtaining a global histogram smoothing function according to an exemplary embodiment.

Referring to FIG. 4, in operation S401, the image processing apparatus 100 may obtain a histogram smoothing function for each of the regions into which an image is divided based on a similarity between pixel values of adjacent pixels.

In operation S403, the image processing apparatus 100 may determine a second weight value proportional to a size of a region corresponding to the region-based histogram smoothing function which is obtained in operation S401. The second weight value applied to the region-based histogram smoothing function may have different values.

In operation S405, the image processing apparatus 100 may obtain an average value of a histogram smoothing function for each pixel in the regions, to which the second weight value is applied, by using the second weight value which is obtained in operation S403.

In operation S407, the image processing apparatus 100 may obtain a global histogram smoothing function, based on the average value which is obtained in operation S405. That is, the image processing apparatus 100 may obtain the average value, which is obtained in operation S405, as the global histogram smoothing function. A method of obtaining the global histogram smoothing function illustrated in FIG. 4 may correspond to the above-described Equation (1).

The image processing apparatus 100 may obtain, for each pixel, a final smoothing function based on a characteristic of a pixel by using the above-described local smoothing function and the global histogram smoothing function which is obtained in operation S407, and determine each pixel value by using the smoothing function.

Figure 5:
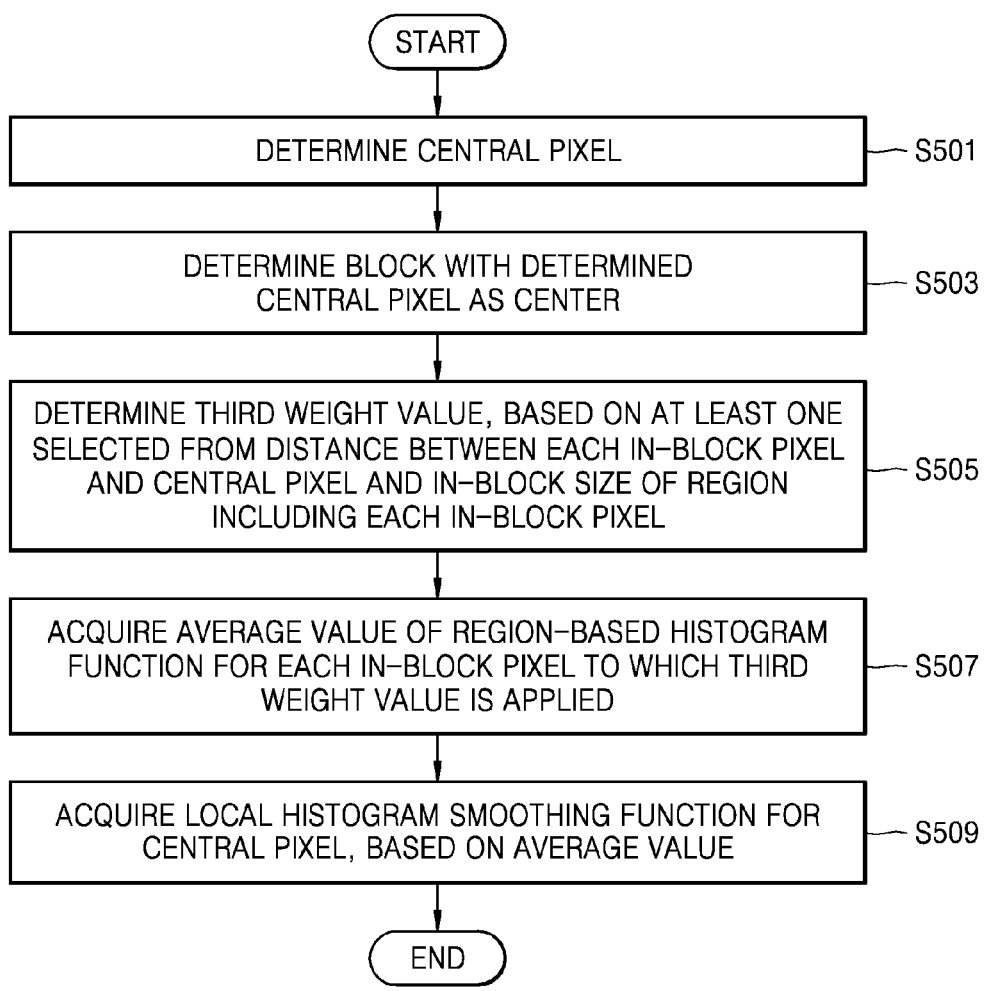
FIG. 5 is a flowchart illustrating a method of acquiring a local histogram smoothing function according to an exemplary embodiment.

FIG. 5 is a flowchart illustrating a method of obtaining a local histogram smoothing function according to an exemplary embodiment.

Referring to FIG. 5, in operation S501, the image processing apparatus 100 may determine a central pixel (x, y). A local smoothing function may be obtained as a smoothing function for the central pixel which is determined in operation S501.

In operation S503, the image processing apparatus 100 may determine a block with the central pixel, which is determined in operation S501, as a center. That is, the image processing apparatus 100 may arrange a block with respect to the central pixel. In this case, according to an exemplary embodiment, the block may have a certain size, and have a smaller size than that of the divided region which is obtained, for example, in operation S301 of FIG. 3.

In operation S505, the image processing apparatus 100 may determine a third weight value applied to a region-based histogram function, based on at least one selected from amongst a distance between each in-block pixel (x', y') and the central pixel (x, y) and an in-block size of a region including each in-block pixel (x', y').

For example, the image processing apparatus 100 may determine the third weight value which is inversely proportional to the distance between each in-block pixel (x', y') and the central pixel (x, y), or is proportional to an in-block size of a region including each pixel. In this case, according to an exemplary embodiment, the third weight value may be determined from a lookup table including a set of results which are previously calculated for an arithmetic operation. Therefore, the image processing apparatus 100 obtains the third weight value faster than it would take to obtain the third weight value if it was calculated as a result of an arithmetic operation, and also decreases a complexity of calculation for obtaining the local smoothing function.

In operation S507, the image processing apparatus 100 may obtain an average value of a region-based histogram function for each in-block pixel (x', y') to which the third weight value, which is determined in operation S505, is applied.

In operation S509, the image processing apparatus 100 may obtain a local histogram smoothing function for the central pixel, based on the average value which is obtained in operation S507. That is, according to an exemplary embodiment, the image processing apparatus 100 may obtain the average value, which is obtained in operation S507, as the local histogram smoothing function for the central pixel.

Furthermore, the image processing apparatus 100 may determine the central pixel for another block in which the local smoothing function is not obtained in operation S501, thereby obtaining the local histogram smoothing function for each pixel.

A method of obtaining the local histogram smoothing function illustrated in FIG. 5 may correspond to the above-described Equation (2).

The image processing apparatus 100 may obtain, for each pixel, a final function based on a characteristic of a pixel by using the above-described global smoothing function and the local histogram smoothing function which is obtained in operation S509, and determine each pixel value by using the final function.

Figure 6:
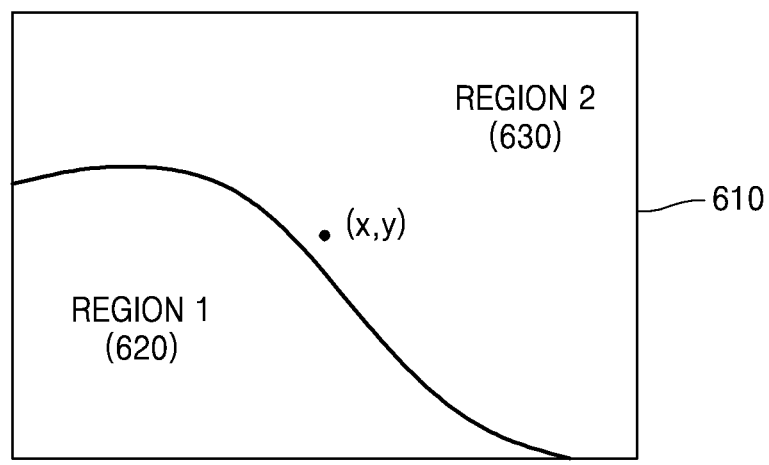
FIG. 6 is a view illustrating a method of acquiring a local histogram smoothing function according to an exemplary embodiment.

FIG. 6 is a view illustrating a method of obtaining a local histogram smoothing function according to an exemplary embodiment.

Referring to FIG. 6, a block 610 which is a portion of an image may be arranged with respect to a pixel (x, y) determined as a central pixel. The block 610 illustrated in FIG. 6 includes a portion of the image, and has the central pixel (x, y) as a center.

The image processing apparatus 100 may obtain a local smoothing function for the pixel (x, y), which is the central pixel, from an average value of a region-based histogram smoothing function to which a third weight value of each of pixels (x', y'), included in a region 1 620 and a region 2 630 which are included in the block 610, is applied. In this case, according to an exemplary embodiment, the third weight value may be inversely proportional to a distance between the central pixel and each of the pixels (x', y'), included in the region 1 620 and the region 2 630, and may be determined as a value which is proportional to a size of a region in the block 610.

For example, a third weight value proportional to "(width of region 1 620 in block)/(block size)" may be applied to a region-based histogram smoothing function for the pixel (x', y') included in the region 1 620.

The image processing apparatus 100 may determine, as a central pixel, each of the central pixel (x, y), illustrated in FIG. 6, and pixels included in a block of an image, and arrange a block with respect to the central pixel, thereby obtaining a local smoothing function for each pixel of the image.

As described above, since a histogram of a divided region for each of similar pixel values shows a characteristic of a normal distribution, a bright region is washed out when an image is processed by using the histogram smoothing function.

According to an exemplary embodiment, a pixel value is determined based on an image characteristic of each pixel value by using a local histogram smoothing function and a global histogram smoothing function, and thus, an image processing operation for enhancing a contrast is performed based on a characteristic of each region.

According to an exemplary embodiment, a step height between blocks and damage to a local characteristic are prevented by using a histogram smoothing function in a relatively greater region than a block without using an in-block histogram. Accordingly, the bright region of the image is not washed out while the remaining portions of the image are depicted in a normal way.

The method according to an exemplary embodiment may be implemented as a code readable by a computer (a non-transitory computer-readable recording medium having information processing capabilities). The computer-readable recording medium includes all types of storage devices that store data readable by a computer system. Examples of computer-readable recording device include ROM, RAM, CD-ROM, magnetic tapes, floppy disks, and optical data storage devices.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. An image processing method by an image processing apparatus, the method comprising:
   dividing an image into at least one region;
   obtaining a region-based histogram smoothing function for processing the image to have a uniform number of pixels based on a pixel value for each region of the divided image;
   obtaining a global smoothing function for an entire region of the image by using the obtained region-based histogram smoothing function of each region in the divided image;
   obtaining a local smoothing function for each pixel in the image by using the region-based histogram smoothing function which is applied to a region included in a block;
   determining a sum of weight values of the global smoothing function and the local smoothing function; and
   determining the pixel value for said each region of the divided image, based on the determined sum of the weight values.

2. The image processing method of claim 1, wherein the determining the pixel value for said each region of the divided image comprises determining a first weight value, based on a characteristic of a pixel, and
   wherein the obtaining the sum of the weight values of the global smoothing function and the local smoothing function comprises obtaining the sum of the weight values is based on the determined first weight value.

3. The image processing method of claim 1, wherein the obtaining the global smoothing function comprises:
   determining, for each of the at least one region, a second weight value for the region-based histogram smoothing function; and
   obtaining an average value for pixel values in said each region, in which the determined second weight value is applied to the region-based histogram smoothing function,
   wherein the second weight value is proportional to a size of a region for the region-based histogram smoothing function.

4. The image processing method of claim 1, wherein the obtaining the local smoothing function comprises:
   determining a central pixel;
   determining a block having a certain size with respect to the determined central pixel; and
   obtaining a local histogram smoothing function for each pixel in the block except for the central pixel by using a histogram smoothing function of a region comprising at least some of the pixels in the block.

5. The image processing method of claim 4, wherein the obtaining of the local histogram smoothing function comprises calculating an average value of a region-based histogram smoothing function, in which an obtained third weight value is applied to each pixel in the block, and
   wherein the obtained third weight value is one of inversely proportional to a distance between a pixel in the block and the central pixel and is proportional to a size of a region in the block.

6. A non-transitory computer-readable storage medium storing a program for executing the image processing method of claim 1.

7. The image processing method of claim 1, wherein the image is divided into a plurality of regions based on similarities between adjacent pixel values, wherein the region based histogram smoothing function is obtained by applying at least one of a histogram equalization method, a brightness preserving bi-histogram equalization method, a dynamic histogram equalization method, and an adaptive histogram equalization method.

8. The image processing method of claim 7, wherein the similarities between adjacent values is determined based on whether a difference value between the adjacent pixel values is within a predetermined range.

9. The image processing method of claim 7, wherein the global smoothing function is obtained for an entire image based on calculating an average value of values in which different weight values are applied to a plurality of the region-based histogram smoothing functions.

10. An image processing apparatus comprising:
    a region divider configured to divide an image into at least one region;
    a region-based histogram smoothing function obtainer configured to obtain a region-based histogram smoothing function for processing the image to have uniform number of pixels based on a pixel value for each of the divided at least one region;
    a global smoothing function obtainer configured to obtain a global smoothing function for an image using based on the obtained region-based histogram smoothing function;
    a local smoothing function obtained configured to obtain a local smoothing function for each pixel in the image using the region-based histogram smoothing function which is applied to a region in a block; and
    an image processor configured to obtain a sum of weight values of the global smoothing function and the local smoothing function, and configured to determine the pixel value based on the obtained sum of the weight values.

11. The image processing apparatus of claim 10, wherein the image processor is further configured to determine a first weight value, based on a characteristic of a pixel, and configured to obtain the sum of the weight values of the global smoothing function and the local smoothing function, based on the determined first weight value.

12. The image processing apparatus of claim 10, wherein, the global smoothing function obtainer is further configured to determine, for each region, a second weight value for the region-based histogram smoothing function, and is further configured to obtain an average value derived from values to which the second weight value is applied
    wherein the second weight value is proportional to a size of a region for the region-based histogram smoothing function.

13. The image processing apparatus of claim 10, wherein the local smoothing function obtainer is further configured to determine a central pixel, to determine a block with a predetermined size based on the determined central pixel, and to obtain a local histogram smoothing function for each pixel by using a histogram smoothing function of a region which comprises pixels in the block except for the central pixel.

14. The image processing apparatus of claim 13, wherein, the local smoothing function obtainer is further configured to calculate an average value of a region-based histogram smoothing function, in which an obtained third weight value is applied to each pixel included in the block, to obtain the local histogram smoothing function, wherein the obtained third weight value is one of inversely proportional to a distance between a pixel included in the block and the central pixel, and proportional to a size of a region in the block.

\* \* \* \* \*